No. 874,854. PATENTED DEC. 24, 1907.
H. H. MADDREN.
PIPE TONGS.
APPLICATION FILED MAY 13, 1907.

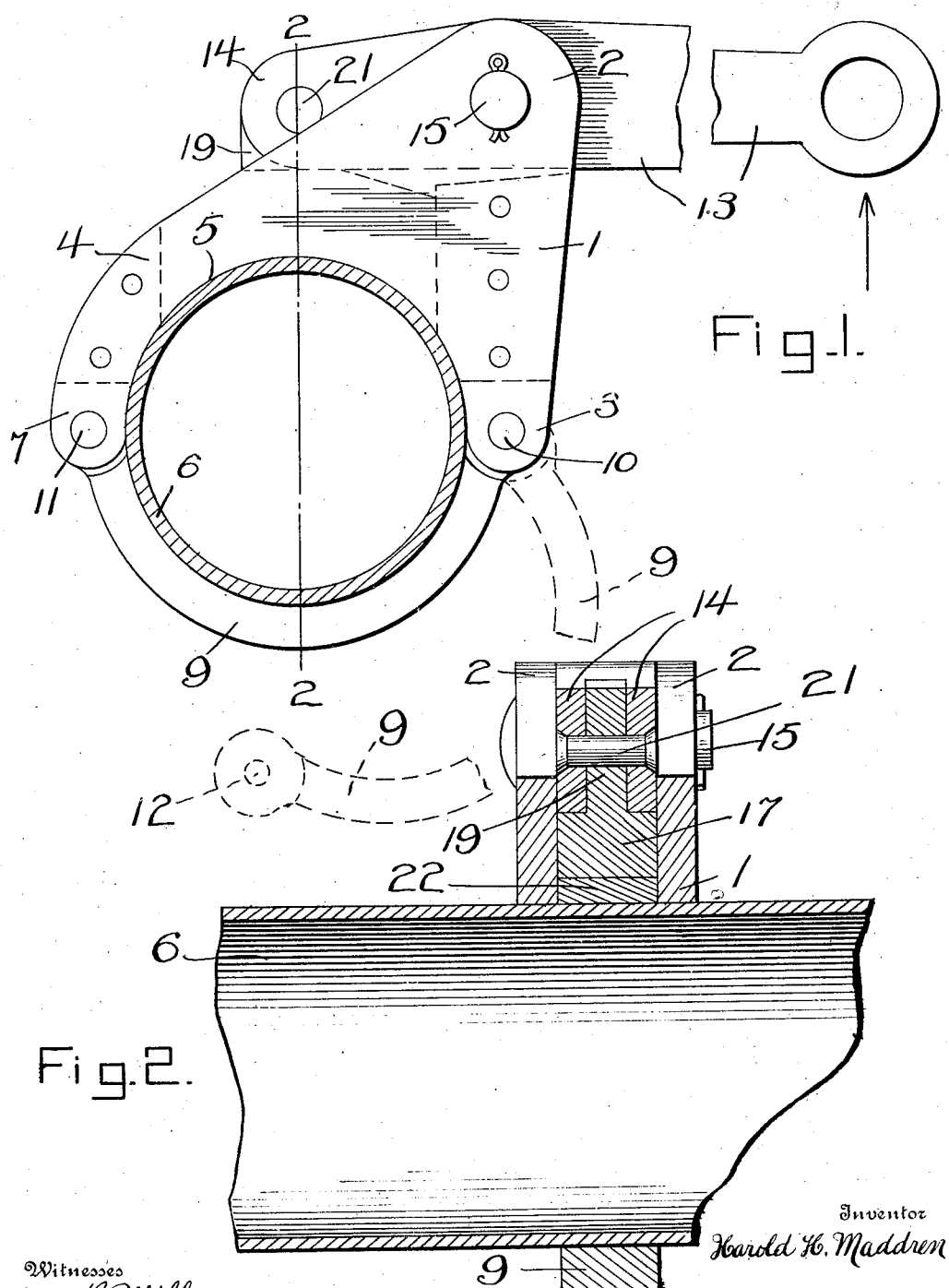

2 SHEETS—SHEET 2.

Witnesses
J. C. Miller
John Bowers

Inventor
Harold H. Maddren

By
Chandler & Chandler
Attorneys

UNITED STATES PATENT OFFICE.

HAROLD H. MADDREN, OF HOLLYWOOD, CALIFORNIA.

PIPE-TONGS.

No. 874,854.　　　　Specification of Letters Patent.　　　Patented Dec. 24, 1907.

Application filed May 13, 1907. Serial No. 373,446.

*To all whom it may concern:*

Be it known that I, HAROLD H. MADDREN, a citizen of the United States, residing at Hollywood, in the county of Los Angeles, State of California, have invented certain new and useful Improvements in Pipe-Tongs; and I do hereby declare the following to be a full, clear, and exact description of the invention, such as will enable others skilled in the art to which it appertains to make and use the same.

This invention relates to new and useful improvements in pipe tongs for use in connection with the tubes or casings of Artesian and oil wells, and it has particular reference to a device of this character embodying a lever and pipe gripping members suspended therefrom, and designed upon movement of the lever in one direction to frictionally engage the pipe and upon movement in an opposite direction to release the same.

Figure 3:
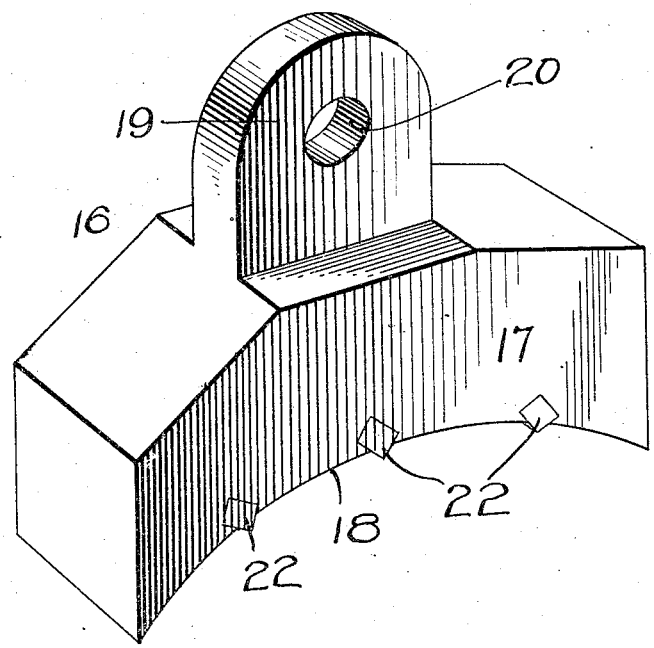
Figure 4:
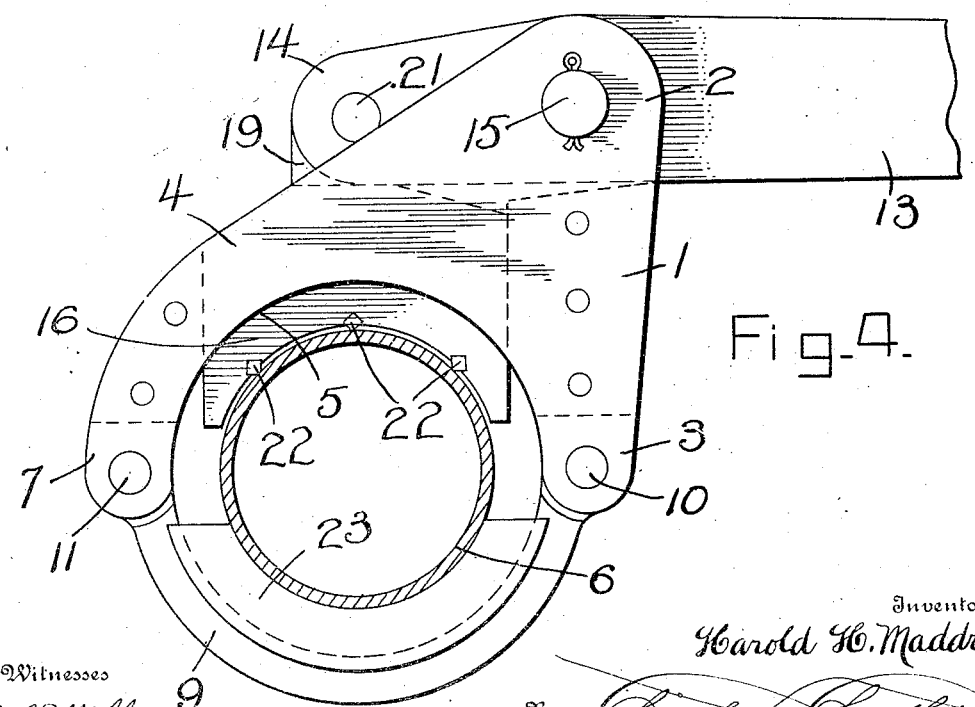

In connection with a device of the above type the invention aims as a primary object to provide a novel construction, combination, and arrangement of parts, the details of which will appear in the course of the following description, in which reference is had to the accompanying drawings, forming a part of this specification, like characters of reference designating similar parts throughout the several views wherein:

Figure 1 is a side elevation showing the manner of use of a device constructed in accordance with the present invention, the disengaged position of the frictional gripping element being indicated by dotted lines. Fig. 2 is the section on the line 2—2 of Fig. 1. Fig. 3 is a detailed perspective view of the frictional gripping element. Fig. 4 is a side elevation illustrating the manner of use of a slightly modified embodiment of the invention.

Referring specifically to the accompanying drawings, the numeral 1 designates a member which is formed at its upper end with spaced ears 2 and at its lower end with spaced ears 3. Projecting forwardly from the member 1, are spaced parallel jaws 4, having curved lower surfaces 5, formed to partially surround a pipe 6. The jaws 4 at their outer ends are formed with extended apertured ears 7. A curved link 9 is arranged in opposition to the jaws 5 and coacts therewith to surround the pipe. With this object in view the link 9 is pivoted by a pin 10 between the ears 3 and its free end is detachably engaged by means of a pin 11 between the ears 7, the said free end being provided for this purpose with an aperture 12.

The tongs are manipulated by a lever 13 having a bifurcated end 14. Said lever at a distance from its end 14, is pivoted by means of a pin 15 between the ears 2.

The gripping member is designated generally by the numeral 16 and comprises a block 17 having a curved widened face 18 and a reduced portion 19, formed with an opening 20. The reduced portion 19 is pivotally engaged between the bifurcations of the end 14 by means of a pin 21. Gripping dies 22 are countersunk into the curved face 18, and have their sharpened corner portions projecting therebeyond, said gripping dies being preferably rectangular in cross section and transversely disposed.

In use, the device may be operated manually or by power, and the lever 13 upon its initial movement in the direction indicated by the arrow in Fig. 1 will move the member 16 to frictionally grip the pipe. Continued movement of said lever in the same direction moves the entire structure together with the pipe about the axis of the latter. Movement of the lever 13 in an opposite direction disengages the member 16 from the pipe and resets the tongs for further operation in the manner above described.

In the modified embodiment of the invention illustrated in Fig. 4, the same is employed in connection with a pipe of reduced size. To this end, a member 16 of increased depth is employed conjunctively with a curved bushing 23 interposed between the link 9 and the pipe.

The device embodied in the present invention is simple in construction, inexpensive to manufacture and practical and efficient in use.

From the foregoing description it will be seen that simple and efficient means are provided for accomplishing the objects of the invention, but while the elements herein shown and described are well adapted to serve the functions set forth it is obvious that various minor changes may be made in the proportions, shape and arrangement of the several parts, without departing from the spirit and scope of the invention as defined in the appended claims.

What is claimed is.

A device of the type set forth, comprising a lever, having a bifurcated end, a member pivotally suspended from said lever at a distance from said bifurcated end and having forwardly projecting jaws formed with curved lower faces, a curved link pivoted at one end to said member, and designed to have its other end detachably engaged with the ends of said jaws, and a gripping member pivotally suspended from said bifurcated end and disposed for movement between said jaws, said member being formed with a wide curved face having gripping dies embedded therein.

In testimony whereof, I affix my signature, in presence of two witnesses.

HAROLD H. MADDREN.

Witnesses:
 GEORGE BUGBEE,
 WM. G. ROBERTS.